May 13, 1958  F. A. RYDER ET AL  2,834,336
VEHICLE COMBUSTION HEATER
Filed Sept. 2, 1955  4 Sheets-Sheet 2
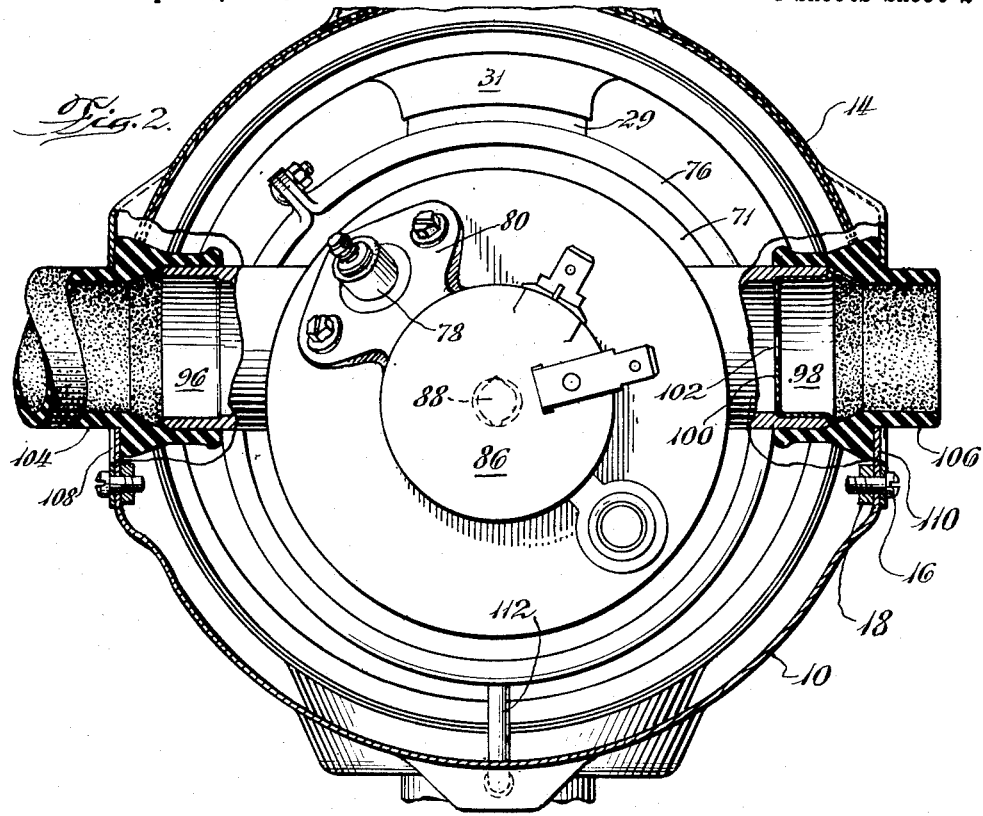
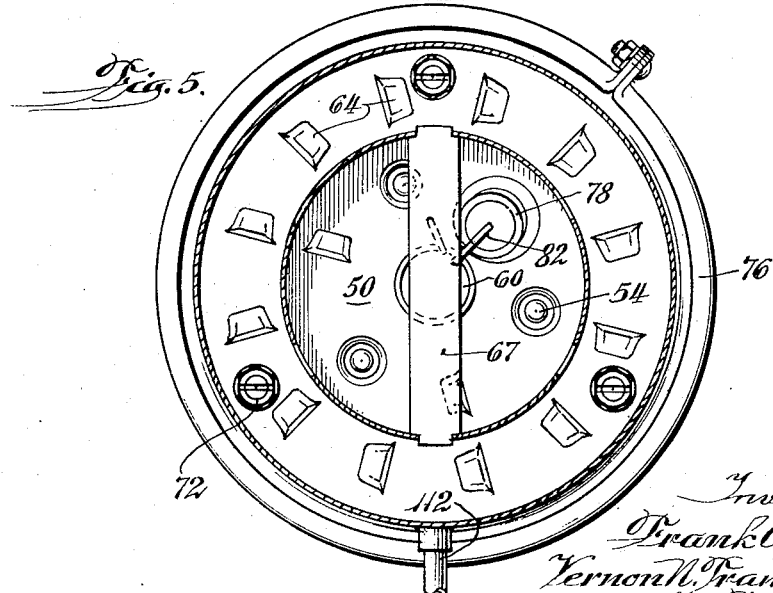
Inventors:
Frank A. Ryder
Vernon N. Tramontini
John F. Wein
By Ahlberg, Kuipper & Bradolph
Attorneys.

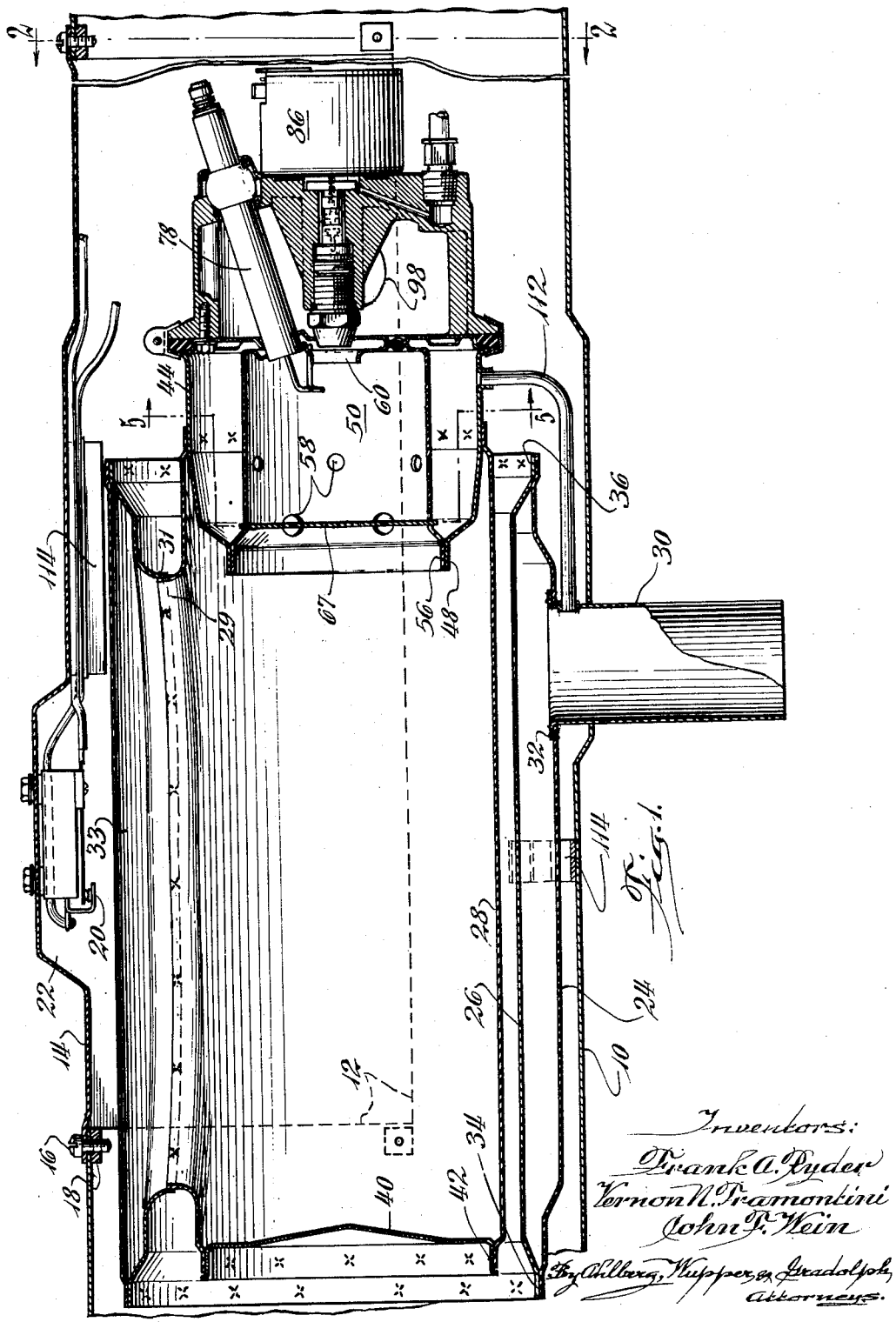

May 13, 1958 F. A. RYDER ET AL 2,834,336
VEHICLE COMBUSTION HEATER
Filed Sept. 2, 1955 4 Sheets-Sheet 3
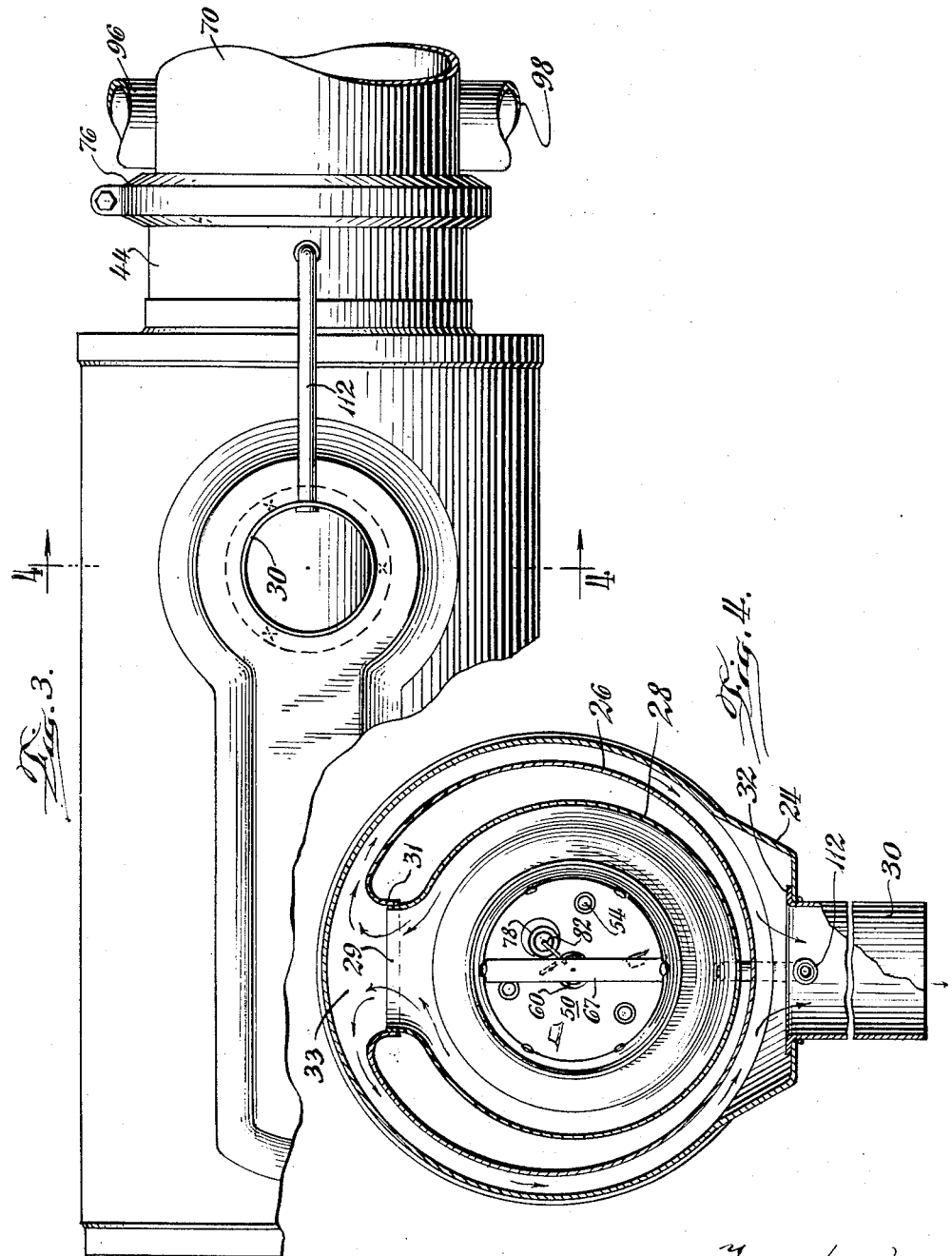

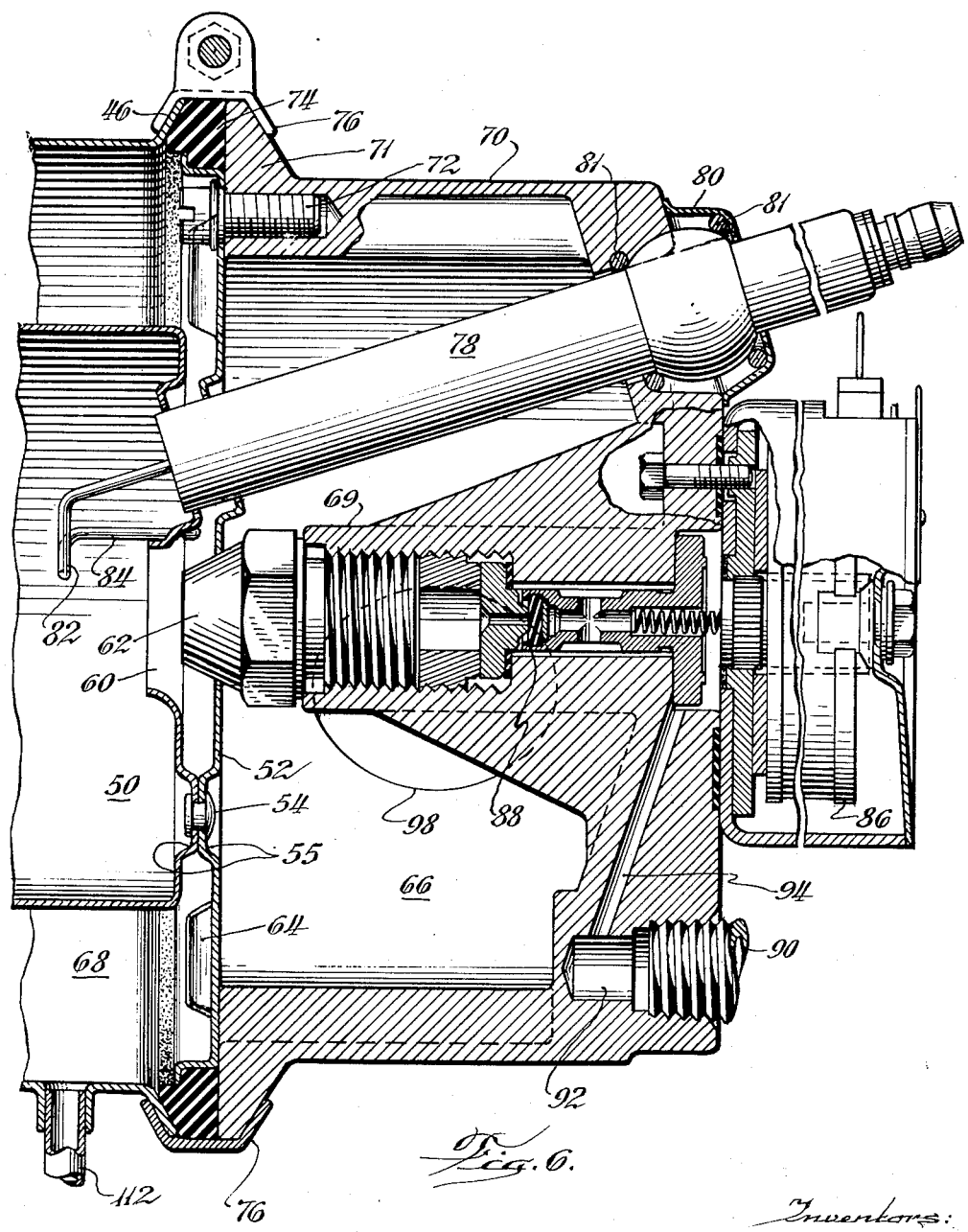

//! # United States Patent Office 2,834,336
Patented May 13, 1958

2,834,336

VEHICLE COMBUSTION HEATER

Frank A. Ryder, Vernon N. Tramontini, and John F. Wein, Indianapolis, Ind., assignors to Stewart-Warner Corporation, Indianapolis, Ind., a corporation of Virginia Application September 2, 1955, Serial No. 532,299

6 Claims. (Cl. 126—116)

The present invention relates to sealed combustion heaters, primarily of the type intended for use in automobiles and other automotive vehicles having a readily available source of liquid fuel such as gasoline, for instance.

One of the objects of our invention is to provide a novel combustion heater of the sealed type which can be fabricated at relatively low cost primarily through the use of shaped and seam-welded sheet metal members, thereby adapting the heater structure to low cost, relatively common production techniques.

Still another object is to provide a device of the above character which admirably fulfills its function as an automobile heater, for instance, and which is so constructed as to facilitate service and inspection of the heater elements which might under some circumstances require attention.

Yet another object is to provide a novel combustion heater having the above advantages in which the heat exchanger element has high thermal efficiency and yet is small and light in weight and is extremely simple to fabricate on a production basis and which in addition has extremely long life characteristics even under severe conditions of operation where rapid fluctuation in the temperature of the heat exchanger is encountered.

Other objects and advantages will become apparent from the following description of a preferred embodiment of our invention which is illustrated in the accompanying drawings.

In the drawings, in which similar characters of reference refer to similar parts throughout the several views:

Fig. 1 is substantially a longitudinal vertical medial sectional view of a heater embodying our invention, excepting that the sparking igniter electrodes and fuel inlet passages have been moved slightly to place them in the plane of section in the interest of better understanding of the invention;

Fig. 2 is a transverse sectional view which may be considered as taken substantially along the line 2—2 of Fig. 1, showing the major portion of the heater structure in elevation from the burner end. In this view the elements are in their true location;

Fig. 3 is a bottom elevation of the heat exchanger of the heater of Figs. 1 and 2, shown with the burner attached thereto;

Fig. 4 is a transverse sectional view through the heat exchanger and may be considered as taken substantially along the line 4—4 of Fig. 3;

Fig. 5 is a transverse sectional view taken in the direction of the arrows substantially along the line 5—5 of Fig. 1; and Fig. 6 is a longitudinal sectional view of the burner drawn to larger scale. It may be considered as an enlargement of a portion of Fig. 1.

The heater which forms the subject matter of this invention consists briefly of a spray type burner which supplies hot products of combustion directly to the inside of a sheet metal heat exchanger from which the heat is exchanged to a ventilating air stream, while the cooled products of combustion pass from the heat exchanger by way of an exhaust fitting. Combustion air is supplied to the heater burner from any suitable means such as a blower, not shown. Fuel is supplied from a pump, not shown, to the nozzle by way of a magnetic on-off valve, so that fuel is sprayed from the nozzle only when the magnetic valve is energized. The burner is spark ignited by means of a suitable step-up transformer or spark coil not shown.

A combustion air blower, a ventilating air blower, a source of high tension electricity, a fuel pump and a control circuit are not shown, since they form no part of the present invention and may of course take many optional and well known forms. The present invention is primarily concerned with the physical structure of the heater unit itself, that is, the heat exchanger and associated burner, rather than with the accessories or control equipment.

One method for regulating a heater of the present type calls for using a ventilating air duct thermostat for automatically turning the fuel on and off as heat is required, while causing the ventilating air to flow continuously so as to keep the temperature of the ventilating air leaving the heater approximately constant. This mode of heater operation is simple and quite satisfactory, but places great demands upon the heater heat exchanger, since the metal of the heat exchanger is alternately rapidly heated and rapidly cooled and therefore is subjected to wracking stresses due to alternate differential expansion and contraction of the several portions of the heat exchanger. The heat exchanger of the present invention when operated in this fashion has demonstrated an extremely great capacity to withstand these forces and as a consequence has proved to have an extremely long useful and trouble-free life. This is accomplished largely by introducing great flexibility into all portions of the heat exchange system as will appear.

Referring now to the structure of the heater, we have indicated a generally cylindrical sheet metal case at 10 through which the ventilating air flows. For this purpose it may be considered that the right hand end, as illustrated in Fig. 1, is connected to a source of ventilating air, such as a ventilating air blower for instance, while the opposite end of the case is connected to duct work leading to the space to be heated.

In order to facilitate assembly and servicing of the heater, a generally rectangular section, as indicated by the line 12, is cut out of the duct 10 at the top, the opening thus formed, which extends about to the center line, being closed by a removable curved cover 14 secured to the duct 10 as by screws 16 threaded into nuts 18 which are anchored to the duct 10. Sheet metal screws may be used if desired.

Since it is common to provide an overheat safety thermostatic switch for a heater of this character so as to turn off the burner in the event that the metal of the heat exchanger becomes too hot, we have shown such a safety switch at 20 mounted in a recess 22 in the cover 14. This is an appropriate location for this switch, since it is thus placed close to the heat exchanger where it is subject to radiation heating and furthermore it is readily accessible for adjustment, or checking, simply by removing the cover 14.

The heat exchanger is preferably formed of stainless steel or similar metal and is comprised principally of three nested, generally cylindrical sheet metal tubes. The outermost of these tubes is indicated at 24. It encloses the intermediate tubular member 26 which in turn surrounds the innermost tube 28. The three tubes are well spaced from each other. At the bottom of the heater, the outermost tube 24 is flattened somewhat longitudinally so as to provide a longitudinally extending space for the collection of exhaust which is conveyed to a tubular outlet fitting 30. This fitting or spud is flanged at its inner end as at 32, and is seam-welded to the metal of the outermost heat exchanger tube 24. The fitting 30 extends downwardly through an opening in the air case 10 so as to be available for the attachment of an exhaust line which may lead to any suitable location.

The ends of the intermediate tube 26 are stretch-formed to larger diameter, as indicated at 34 and 36, so that the external diameter at the stretched portions fits the internal diameter of the external tube 24. In accomplishing this, some inward or outward shaping of the ends of the tube 24 may be advisable as an aid to convenient fabrication. As shown, the right end at 36 is slightly larger than the left end at 34 so that in assembling the elements, the tube 26 may freely be slid endwise into the left end of the tube 24 for almost its entire length, some pressure being applied to bring about a final seating between the interfitting tube ends.

The left hand end of the innermost tube 28 is closed by an outwardly flanged closure member 40 which is pressed into place with its flange 42 tightly fitted into the end of the opening in the innermost tube 28. To facilitate fabrication, this end of the tube 28 may also be shaped inwardly or outwardly slightly, this shaping being not so much for the purpose of altering the dimension as for the purpose of arriving at a predetermined dimension. In other words, it is easier to form sheet metal tubes such as 28, 26 and 24, approximately to desired size and then stretch or shrink the ends sufficiently to exceed the elastic limit of the metal and thereby to arrive at a definite dimension, than it is to attempt to make the tubes with the desired precision of fit without this supplemental shaping.

A tubular burner adapter fitting 44 is shown at the right hand end of the tube 28 with approximately half its length projecting into the space within the tube 28. It, like the other elements, is formed of sheet metal and is flared at its outer end as at 46, while its inner end is shaped inwardly to a smaller dimension to form a cylindrical flange 48.

At the top, the innermost shell 28 has a longitudinally extending portion punched out to form a slot. The slot thus formed does not approach either of the ends very closely. The metal in the vicinity of this slot is also drawn outwardly and thus forms a peripheral outstanding rib 29 surrounding a long, narrow, generally rectangular opening with well-rounded ends. The metal of the intermediate shell 26 is similarly punched and drawn inwardly at the top so as to form a similar slot and peripheral rib 31 which is of such a size and shape as to telescope over the rib 29. These two ribs are then telescoped and seam welded together in a manner to be discussed presently so as to be joined entirely around their periphery thereby providing an airtight passage 33 between shells 28 and 26.

It should be noted further that the inner sleeve 28, together with the burner mechanism carried thereby (as will be described presently), is supported entirely separately from the intermediate shell 26 excepting for the connection at the joint between the ribs 29 and 31. This gives a quite resilient support to the interior of the heat exchanger with respect to the outer portion thereof and this prevents differential expansion and contraction of the order encountered in a device of this character, from producing wracking stresses on the metal which otherwise results in a breakdown of the joints between the elements.

The combustion chamber of the burner is illustrated at 50 and consists of a generally cylindrical sheet metal cup with the base thereof secured to a circular plate 52 at by riveting, as shown at 54. In order to space the base of the cup slightly from the plate 52, the rivets pass through stamped bosses 55 formed either in the plate or cup base or both. The cup 50 has its outer end flared outwardly to provide a flange 56 which forms a loose sliding fit with the flange 48 of the adapter. The cup 50 is provided with several combustion air entry holes 58 in its side wall and the base thereof has a flanged opening 60 surrounding a fuel spray nozzle 62. The end of this nozzle projects through a hole at the center of the plate 52 and this plate 52 also is lanced and deformed to provide several louvers 64 which permit combustion air to pass from a chamber 66 to the right of the plate 52 into the annular chamber 68 formed within the adapted 44 with a swirling motion. Air from the annular chamber 68 then passes inwardly through the previously mentioned holes 58 and through the opening 60 around the end of the nozzle 62 with a rotary component. In order to provide desirable turbulence within the burner, a narrow strip of metal 67 extends across near the mouth of the combustion chamber. It is secured simply by snapping its ends, which are slightly narrower, into two of the holes 58.

A cup 70, readily formed as a die casting, for instance since it remains cool, is provided with a peripheral flange 71 at its open end. This cup is secured with its open face against the back of the previously mentioned plate 52 by means of screws 72, and the flanges 71 and 46, together with a resilient sealing gasket 74, are all secured together by a screw tightened, split peripheral clamping band 76.

As shown, the insulator for one of the electrodes of the spark igniter is indicated at 78. It extends through an opening at the base of the cup 70 and aligned openings in the plate 52 and combustion chamber 50 and is secured in place by a screw held clamp fitting 80 and gaskets 81. It is so positioned that its electrodes 82 extend into the combustion chamber in close proximity to a grounded electrode 84 welded to the base of the combustion chamber 50 in an appropriate location.

The nozzle 62 is secured in the end of a hollow stem 69 formed at the center of the cup 70 and this stem also contains the elements of the magnetically actuated poppet fuel valve 88. The coil for actuating the valve is indicated at 86 and is secured against the base of the cup 70. Fuel is brought to the valve by way of an inlet fitting 90 and a cored passage 92 which intersects a passage 94 drilled in the casting so as to intersect the valve chamber in the stem 69.

Air for combustion is brought into the space 66 within the cup 70 through one of a pair of horizontal hollow bosses 96 or 98. These bosses are formed as a portion of the die casting 70. Two are provided, one on each side, so that the tube from the combustion air blower can be connected on whichever side is the more convenient for a particular installation. The opposite opening is partially closed by a pressed in flanged plate 100 which has a small hole 102 (in the present example, of the order of one-fourth inch in diameter) therethrough. This hole helps in preventing noisy operation of the burner.

It will be noted that each of the air bosses is fitted to a rubber tubular member 104 or 106 which extends outwardly to form a flat vertical face 108 or 110 which engages the inside surface of the sheet metal around openings formed between the case 10 and cover 14 to permit the passage of the members 104 and 106. This arrangement acts as a seal for the openings in the air case 10 and also provides resilient support for the burner, combustion chamber, and heat exchanger. One of these tubular members 104 is connected to the end of the combustion air inlet hose and serves as the means for conducting air into the chamber within the cup 70.

Additional means for supporting and locating the heat exchanger outer shell 24 within the casing 10 may take the form of sheet metal spacing clips secured to the inside surface of the case 10 as at 114 for instance.

With the above structure it will be seen that the heat exchanger and the burner are secured together as a single unit which is mounted within the air casing 10 and supported therefrom in a manner that provides for free movement within a limited range. No strain is put upon the metal of the heat exchanger, therefore, due to expansion and contraction which occurs differentially, as between the heat exchanger and the air case 10.

It will be apparent that by removing the cover 14 and by removing or sufficiently loosening the clamping band 76, the burner casting 70, the sparking electrode 78, the nozzle 62, the fuel valve and actuator therefor 88—66 may be removed from the heater in one piece simply by slipping the combustion chamber 50 to the right out of its adapter tube 44. Thus, all of the elements of the heater which might require attention, including the overheat switch 20, which is attached to the cover 14, are readily accessible simply by removing the cover 14 and the clamping band 76. The heat exchanger and air case 10 and its mounting brackets and connections to the ventilating air duct work may be allowed to remain in place undisturbed.

Note also that the only sealed joint between the burner mechanism and the heat exchanger is at the clamping band 76 which remains cold. It is well removed from the hot portions of the heat exchanger and burner and also cold ventilating air flows over the joint while cold combustion air flowing through the space 66 and air chamber between the combustion chamber 50 and adapter 54 has a cooling effect. This permits the use of a simple molded rubber sealing element at 74 and insures that the burner mechanism will be well sealed and will be readily removable even after extended use, since there will be no warping or roughening of the matching surfaces due to combustion. The joint between the flanges 48 and 56 can be relatively loose and therefore gives no difficulty, it being appreciated that looseness will merely result in a small amount of additional combustion air flowing into the heat exchanger around the combustion chamber.

In fabricating the heat exchanger, several approaches may be taken. One of these, which may be considered as typical and straightforward, is to first seam-weld the flange 32 of the exhaust spud 30, to the outer shell 24. This can be easily accomplished because both ends of the shell 24 are open and therefore the inner electrode for conducting the welding operation may be inserted from either end. Next, the end cap 40 may be pushed into the end of the inner tube 28 and seam-welded into place, there being no problem of clearance in conducting this operation.

The inner shell 28 may then be slid into the intermediate shell 26 and the ribs at 29 and 31 telescoped into final position. Thereafter, a tong type split electrode formed of a pair of shaped bars may be slid in an endwise direction between the inner shell 28 and the intermediate shell 26 and clamped together. In this position the electrodes entirely surround the telescoped joint and fit against the outer surface of the rib 31. With the sheet metal parts thus clamped in a fixture, a small resistance welding wheel may be inserted into the slot from a position outside the intermediate shell and run around the joint so as to form a seam weld, the current passing between the wheel and the surrounding clamp-type electrode by way of the two thicknesses of metal.

The assembly of the intermediate tube 26 and inner tube 28 as a unit is then slid in an endwise direction from the right into the outer tube 24 to the position shown and seam-welded at each end in a customary fashion. Finally, or this may be done earlier, the burner adapter fitting 44 may be pressed into its end of the inner tube 28 and seam-welded into place.

From the above it will be seen that due to the novel construction of the heat exchanger, all of the parts can be easily fashioned and joined by the use of sheet metal shaping and resistance welding equipment without the necessity for any torch or arc-welding to complete the assembly.

In order to remove any unburned fuel that may possibly leak from the nozzle 62 into the combustion chamber 50, an L-shaped drain tube 112 extends from a low point in the adapter fitting 44 to the exhaust spud 30. At neither end of this drain tube is the temperature ever very high and therefore the joints between the ends of this tube and the sheet metal may be sealed by silver soldering, in an oven if desired. With the exception of these two small joints, all elements of the assembly are joined solely by resistance welding which can be conducted at far lower cost than either torch or arc-welding.

In this heater, assuming a supply of ventilating air, combustion air, fuel under pressure and high tension electricity, all appropriately connected as previously mentioned, opening the fuel valve causes fuel to be sprayed from the nozzle, mixed with combustion air and ignited by the spark between the igniter electrodes. Hot products of combustion pass from the combustion chamber into the inner shell 28 and thence through the passage 33 into the space between the intermediate shell 26 and the outer shell 24. The hot gases then flow circumferentially in both directions and longitudinally to the exhaust fitting 30. Hot products of combustion therefore heat all the heat exchange surfaces.

Ventilating air removes the heat by flowing longitudinally around the outer shell 24 and between the intermediate shell 26 and the inner shell 28.

From the above description of a preferred embodiment of our invention it will be seen that the heater provides all of the advantages set forth for it. It will also be understood that alterations and variations in the structure can be made without departing from the scope or spirit of the invention and that the scope of the invention is to be measured by the scope of the following claims.

Having described our invention, what we claim as new and useful and desire to secure by Letters Patent of the United States is:

1. In a relatively small, compact vehicle heater of the sealed combustion type, means forming three nested generally cylindrical sheet metal shells with the second of said shells being located within the first, and the third being located within the second in closely spaced relation thereto, a flanged end cap closing one end of said third shell, a burner secured in and closing the other end of said third shell, said second shell being expanded at its ends to fit said first shell and being welded thereto, said third shell having a single longitudinally extending slot therein having a length less than the length of said third shell, the metal of said third shell surrounding said slot being shaped outwardly to form a peripheral outstanding rib surrounding said slot, said second shell having a single longitudinally extending slot formed therein with the metal surrounding the last said slot being shaped inwardly to form a peripheral rib surrounding the last said slot, said peripheral ribs being telescoped a distance not greater than the spacing distance between said third and second shells opposite said slots and joined together by resistance welding such that said welded-together ribs serve to support said third shell, said burner, and said flanged end cap from said second shell, whereas said second shell is supported at its ends from said first shell and said joined slots form a single passage connecting the interior of said third shell to the space between said first and second shells, said first shell having an exhaust outlet opening formed therein on the side opposite said passage, a sheet metal air case surrounding said first shell and spaced therefrom to form a generally annular passage between said first shell and said air case, means supporting said first shell from said case, and an exhaust fitting secured to said first shell around said exhaust outlet opening, said fitting extending through an opening in said air case.

2. In a relatively small, compact vehicle heater of the sealed combustion type, means forming three radially spaced and nested generally cylindrical sheet metal shells with the second of said shells being located within the first, and the third being located within the second in closely spaced relation thereto, a flanged end cap fitted into and seam-welded to said third shell at one end thereof, a burner attachment tubular fitting extending into the other end of said third shell and being seam-welded thereto, said second shell being expanded at its ends to fit said first shell and being seam-welded thereto, said third shell having a single longitudinally extending slot therein having a length less than the length of said third shell, the metal of said third shell surrounding said slot being shaped outwardly to form a peripheral outstanding rib surrounding said slot, said second shell having a single longitudinally extending slot formed therein with the metal surrounding the last said slot being shaped inwardly to form a peripheral rib surrounding the last said slot, said peripheral ribs being telescoped a distance not greater than the spacing distance between said third and second shells opposite said slots and joined together by seam welding such that said welded-together ribs serve to support said third shell, said burner fitting and said flanged end cap from said second shell, whereas said second shell is supported at its ends from said first shell and said joined slots form a single passage connecting the interior of said third shell to the space between said first and second shells, said first shell having an exhaust outlet opening formed therein on the side opposite said passage, a sheet metal air case surrounding said first shell and spaced therefrom to form a generally annular passage between said first shell and said air case, means supporting said first shell from said case, an exhaust fitting secured to said first shell around said exhaust outlet opening, said exhaust fitting extending through an opening in said air case, a burner mechanism fitted into said burner attachment fitting and means for removably securing said mechanism to said burner fitting, and resilient support means extending between said burner mechanism and said air case to permit limited radial and longitudinal movement between said burner mechanism and said air case.

3. In a relatively small, compact vehicle heater of the sealed combustion type, heat exchanger means formed of three nested generally cylindrical sheet metal shells with the second of said shells being located within the first and the third being located within the second in closely spaced relation thereto, means closing one end of said third shell, a burner connected to the other end of said third shell for supplying combustion gases thereto, the corresponding ends of said second and first shells being formed to engage each other and being secured together so that said second shell is supported at its end from said first shell, said third shell having a single slot therein having a length less than the length of said third shell, the metal of said third shell surrounding said slot being shaped outwardly to form a peripheral outstanding rib surrounding said slot, said second shell having a single slot formed therein with the metal surrounding the last said slot being shaped inwardly to form a peripheral rib surrounding the last said slot, said peripheral ribs being telescoped a distance not greater than the spacing distance between said third and second shells opposite said slots and joined together by welding such that said welded together ribs serve to support said third shell from said second shell, said joined slots forming a single passage connecting the interior of said third shell to the space between said first and second shells, and said first shell having an exhaust outlet opening formed therein on the side opposite to said passage.

4. A heat exchanger element adapted to withstand thermal shock of a high order comprising, means forming three closely spaced and nested metal tubes, the innermost of said tubes being closed at one end and adapted to receive burner means at the other, means sealing the outer tube to the intermediate tube at both ends to provide an annular space therebetween, said inner tube having a single opening therein with the metal in the vicinity of said opening being shaped outwardly to form an outstanding flange outlining said opening, said intermediate tube having a single opening therein with the metal in the vicinity of the last said opening being shaped inwardly to form a flange outlining the last said opening, said flanges being of a size and shape mutually to telescope, said flanges being telescoped a distance not greater than the spacing distance between said inner and intermediate tubes opposite said openings and being seam welded together, and said outer tube being formed to provide an outlet opening at a position remote from said flanges, whereby the space within said inner tube communicates with the space between said intermediate tube and said outer tube, and said inner tube is supported with respect to said intermediate tube solely by said welded together flanges.

5. In a relatively small heater of the internal combustion type, means forming a heat exchanger, burner means operatively connected to said heat exchanger for supplying combustion gases to the combustion chamber thereof, said exchanger comprising a first generally cylindrical sheet metal shell, a second generally cylindrical sheet metal shell disposed within said first shell in closely spaced relationship thereto and forming the combustion chamber, means closing one end of said second shell, said second shell having a single slot therein with metal surrounding said slot being shaped outwardly to form a peripheral outstanding rib surrounding said slot, said first shell having a correspondingly shaped slot therein with the metal surrounding said last-mentioned slot being shaped inwardly to form a peripheral rib surrounding said last-mentioned slot, said peripheral ribs being telescoped a distance not greater than the spacing distance between said second and first shells opposite said slots and being joined together by resistance welding for suspending said second shell from said first shell, means integrally connected to said first shell in communication with the passage formed by said telescoped ribs for providing an exhaust passage for said gases, the space between said first and second shells providing a passage for ventilating air.

6. In a relatively small vehicle heater of the sealed combustion type, heat exchanger means formed of three nested generally cylindrical sheet metal shells with the second of said shells being located within the first and the third being located within the second in closely spaced relation thereto, the space between said second and third shells defining a passage for air to be heated, means closing one end of said third shell, a burner connected to the other end of said third shell for supplying combustion gases thereto, the corresponding ends of said second and first shells being formed to engage each other and being secured together so that said second shell is supported at its ends from said first shell, said third shell having a single slot therein having a length less than the length of said third shell, the metal of said third shell surrounding said slot being shaped outwardly to form a peripheral outstanding rib surrounding said slot, said second shell having a single slot formed therein with the metal surrounding the last said slot being shaped inwardly to form a peripheral rib surrounding the last said slot, said ribs being telescoped a distance not greater than the spacing distance between said third and second shells opposite said slots and joined together by welding such that said welded together ribs serve to support said third shell from said second shell, said joined slots forming a single passage connecting the interior of said third shell to the space between said first and second shells, the spacing between said second and third shells at said telescoped ribs being greater than that at any other point therebetween to provide for maximum air flow over the welded joint between said ribs, and said first shell having an exhaust outlet opening formed therein on the side opposite to said passage.

References Cited in the file of this patent

UNITED STATES PATENTS

| | | |
|---|---|---|
| 2,379,018 | McCollum | June 26, 1945 |
| 2,401,502 | Olds | June 4, 1946 |
| 2,470,860 | Parrish | May 24, 1949 |
| 2,507,081 | Allen et al. | May 9, 1950 |
| 2,531,939 | Jacobs | Nov. 28, 1950 |
| 2,725,930 | Hillery et al. | Dec. 6, 1955 |